CONTROL MECHANISM

Original Filed Oct. 16, 1961 7 Sheets-Sheet 1

INVENTORS.
EDWARD P. BULLARD III
EDWARD P. BULLARD IV
BY Paul M. Gist
ATTORNEY.

CONTROL MECHANISM

Original Filed Oct. 16, 1961 7 Sheets-Sheet 2

INVENTORS.
EDWARD P. BULLARD III
BY EDWARD P. BULLARD IV
Paul M. Gist
ATTORNEY.

CONTROL MECHANISM
Original Filed Oct. 16, 1961 7 Sheets-Sheet 3
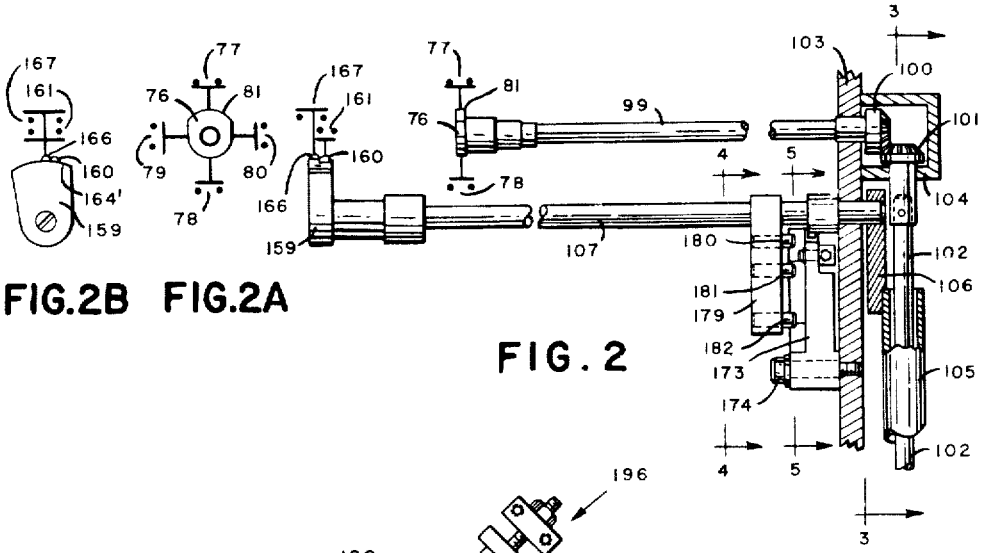
FIG.2B FIG.2A
FIG. 2
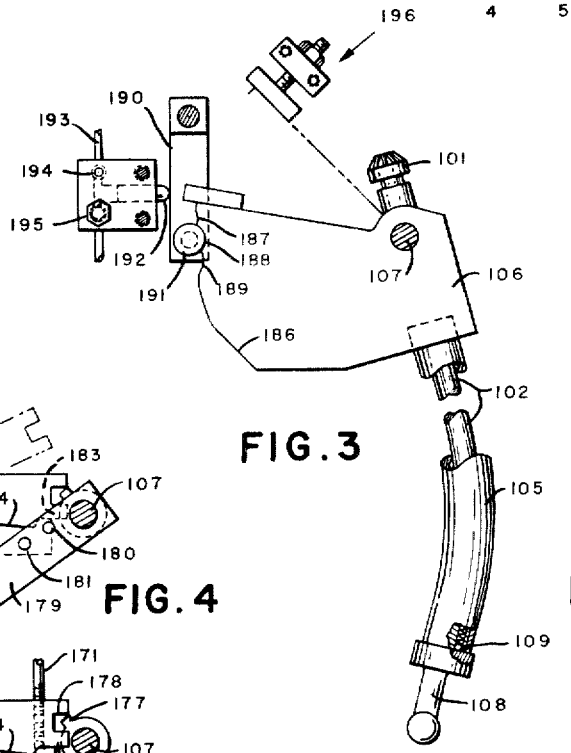
FIG. 3
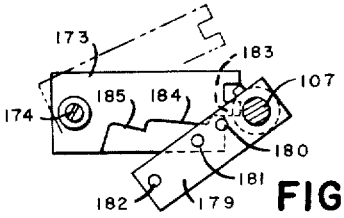
FIG. 4
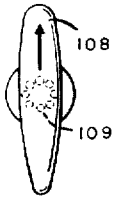
FIG. 6
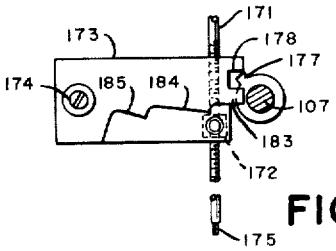
FIG. 5
INVENTORS.
EDWARD P. BULLARD III
EDWARD P. BULLARD IV
BY Paul M. Gist
ATTORNEY.

CONTROL MECHANISM

Original Filed Oct. 16, 1961 7 Sheets-Sheet 4

INVENTORS.
EDWARD P. BULLARD III
BY EDWARD P. BULLARD IV

Paul M. Gist
ATTORNEY

CONTROL MECHANISM

Original Filed Oct. 16, 1961 7 Sheets-Sheet 5

INVENTORS.
EDWARD P. BULLARD III
BY EDWARD P. BULLARD IV
Paul M. Grist
ATTORNEY

CONTROL MECHANISM

Original Filed Oct. 16, 1961 7 Sheets-Sheet 6

INVENTORS.
EDWARD P. BULLARD III
BY EDWARD P. BULLARD IV

ATTORNEY

INVENTORS.
EDWARD P. BULLARD III
BY EDWARD P. BULLARD IV
Paul M. Gist
ATTORNEY

United States Patent Office

Re. 26,007
Reissued Apr. 26, 1966

26,007
CONTROL MECHANISM

Edward P. Bullard III and Edward P. Bullard IV, Fairfield, Conn., assignors to The Bullard Company, Bridgeport, Conn., a corporation of Connecticut Original No. 3,121,349, dated Feb. 18, 1964, Ser. No. 146,082, Oct. 16, 1961. Application for reissue May 24, 1965, Ser. No. 460,612
12 Claims. (Cl. 74—751)

Matter enclosed in heavy brackets [ ] appears in the original patent but forms no part of this reissue specification; matter printed in italics indicates the additions made by reissue.

The present invention relates to machine tools, and particularly to a new and improved program control for causing a machine tool automatically to produce every function which can be produced by an operator manually.

The principal object of the present invention is to provide a program control for a machine tool in which data storage and distance storage means are employed to control all of the functions of the machine tool that normally can be performed manually by an operator.

Another object of the invention is to provide such a control in which a relatively large number of separate devices are employed to separately control the duration of separate functions of the machine tool.

Still another object of the invention is to provide such a control in which separate devices are arranged in series relation for each function of the machine tool so that a coarse and/or fine adjustment of the terminus of a function may be effected.

Still another object of the invention is to provide such a program control in which a pair of discs is rotated at widely different rates by the means that moves a movable member of the machine tool for controlling the terminus of each movement of the member during a cycle of operations.

The above, other objects and novel features of the invention will become apparent from the following specification and accompanying drawings which are merely exemplary.

In the drawings:

FIG. 2 is a view of certain of the manual controls for setting up the control of the present invention;

FIGS. 2A and 2B are end views of cams shown in FIG. 2;

FIGS. 3, 4, 5 and 6 are views of certain other manual control elements;

Figure 1:
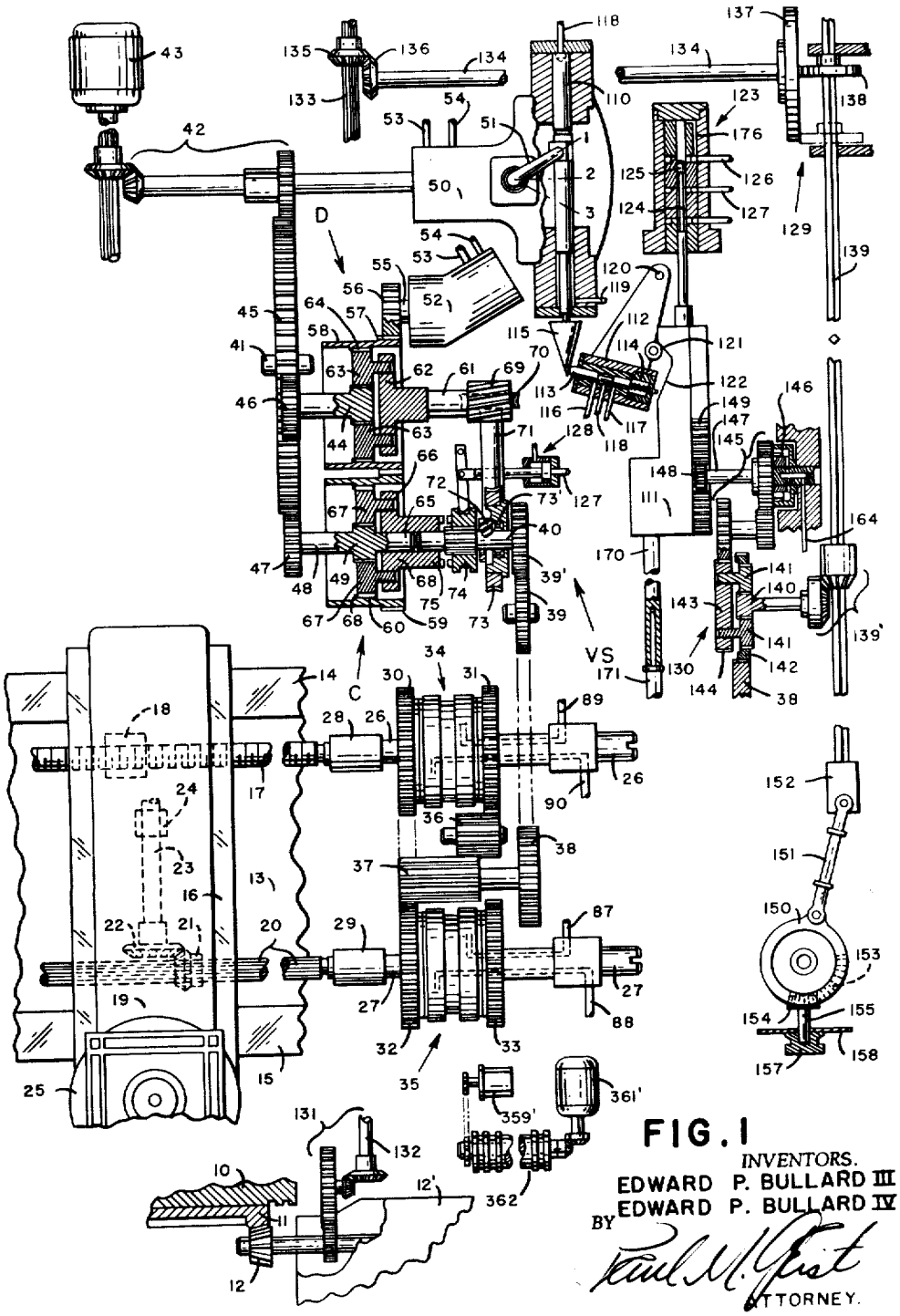
FIG. 1 is a schematic view of certain parts of a machine tool to which certain features of the invention have been applied.

Referring to FIG. 1, the principles of the invention are shown as applied to a lathe in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12'. This variable speed means may be of the conventional gear shifting type or otherwise. The shifting of the gears may be effected by the rotation of cams driven by a motor. The energizing of the motor may be effected by the balancing of two potentiometers as will be described later. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored-out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with it slide 19 along ways 14, 15 of cross rail 13. Furthermore, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each 30, 31, 32 and 33, for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relative to gears 30, 31, 32 and 33 that gears 30 and 32 mesh with gear 37, while gears 31 and 33 may mesh with gear 36. Gears 30 and 33 are shown in a stretch-out, unmeshing position for clarity. From the foregoing it is evident that the rotation of gear 37 will cause gears 30 and 32 to rotate in the same direction, and by virtue of gear 36, will cause gears 31 and 33 to rotate also in the same direction but reversely relative to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through gears 38 and 39, the latter of which may be connected to a gear 39′ fixed to the output shaft 40 of a variable speed transmission VS.

Referring to FIG. 1, an input shaft 41 having a gear 45 fixed thereto may be connected by suitable means such as gearing 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown as connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The motor 43 is also connected directly to a positive displacement variable volume hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement D. Gear 57 may mesh with a gear 59 on a second element 60 of the epicyclic gearing arrangement C.

From the foregoing it is evident that the hydraulic units 50 and 52 comprise a variable speed device that is connected to a second element of each of the epicyclic arrangements D and C. While a hydraulic steplessly variable speed device driven from the motor 43 has been disclosed, it is to be understood that the variable speed device need not be of the stepless variety, of the hydraulic type, nor be driven by the motor 43. It may comprise any form of variable speed device that can be adjusted in two directions throughout its range of speed variation. It may be driven by an external source of power, although when so driven, under certain circumstances a loss of feedback power is experienced which latter can be utilized to advantage to a certain degree and under certain conditions of operation when the variable speed device is driven from the input shaft 41.

The second elements 58 and 60 of the arrangements D and C are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 58 of the arrangement D.

The third element of the C arrangement may comprise a shaft 65 similar to shaft 61 and having an arm 66 journaling planet gears 67 that mesh with the sun gear 49 and the internal gear teeth 68 on the second element 60.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 mounted on shaft 40 with an overriding clutch 73′ there between for a purpose to be described later. A clutch element 74 may be splined to shaft 40 and it may cooperate with clutch engaging means on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 58 rotates oppositely to its sun gear 44 when lever 51 is in its number 1 position, if the proper gear ratios and the proper speed of shaft 55 are employed, shaft 61 can be standing still when reactor 58 is rotating at the proper speed incident to lever 51 being in its number 1 position.

With clutch 74 in the position shown in FIG. 1, and moving lever 51 toward its number 2 position, the speed of shaft 40 wil increase, through the action of overriding clutch 73′, steplessly from zero to a speed coincident with the lever 51 arriving at its number 2 position where reactor 58 is stopped and shaft 61 is rotating at the base speed of the arrangement D. Comtinued movement of lever 51 toward its number 3 position causes reactor 58 to increase in speed from zero, but in a direction reversely to that in which it was rotating during the period when lever 51 was moved from its number 1 to its number 2 position. Expressed differently, reactor 58 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 60 is rotating in a direction opposite to its sun gear 49 and at a maximum speed so that shaft 65 is rotating at a speed below the base speed of the epicylic gearing arrangement C. By employing the proper gear ratio between shaft 61 and shaft 40, the speed of shaft 65 can be slightly greater than the speed of shaft 40 when lever 51 is in its number 3 position so that clutch 74 can be shifted into engagement with clutch element 75 without tooth-on-tooth engagement, the overriding clutch permitting shaft 40 to be rotated at the slightly greater speed of shaft 65.

Movement of lever 51 from its number 3 position to its number 2 position causes reactor 60 to decrease in speed to a stopped condition and consequently causes a stepless increase in speed of shaft 65 and shaft 40. Movement of lever 51 to its number 1 position, of course, reverses the rotation of reactor 60, causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 position to its number 3 position and with clutch 74 in neutral, the speed of shaft 40 can be steplessly varied over a relatively small range of speeds, i.e., speeds from 0 to about 23 r.p.m. Additionally, during movement of lever 51 from its number 3 to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

In order to operate the feedworks transmission to cause movement of the tool support in either direction along either of its paths of motion and at any predetermined feed or traverse speed, a control for the feedworks is provided. While this control may take the form of that shown, described and claimed in application Serial No. 37,677, filed June 21, 1960, in the name of Edward P. Bullard, III, now Patent No. 3,028,768 dated April 10, 1962, it will be shown and described as that covered in application Serial No. 26,783, filed May 4, 1960, in the name of Edward P. Bullard, III, now Patent No. 3,074,295 dated January 22, 1963.

Referring to FIG. 2, the control may include a cam 76 that cooperates with stationary switches 77, 78, 79 and 80. The switches 77 to 80, inclusive, are normally open switches located 90° apart and are closed when in contact with cam surface 81 on cam 76. Movement of the cam 76 is, of course, effected by the oscillation of the cam shaft 99. It may have fixed to its one end a bevel gear 100 that meshes with a bevel gear 101 fixed to one end of a flexible shaft 102. The bevel gears 100 and 101 are journaled in bearings within fixed walls 103 and 104. The flexible shaft 102 may extend through a tubular arm 105 that is provided with a support 106. The support 106 may be fixed to a cam shaft 107 parallel with cam shaft 99.

The end of the flexible cable 102 opposite that connected to the bevel gear 101 may be connected to a hand grip 108 that is journalled in the end of arm 105 opposite that supporting plate 106. A spring pressed detent 109 may be provided for maintaining hand grip 108 in any rotary position to which it is moved. From the foregoing it is evident that turning of hand grip 108 turns cam shaft 99 and consequently actuates switches 77 to 80.

Figure 7:
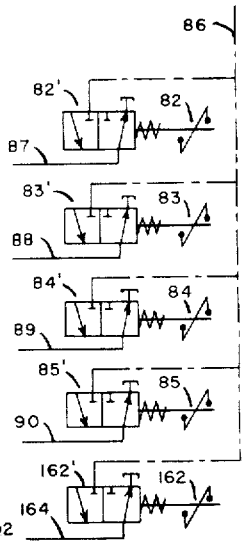
FIG. 7 is a partial wiring diagram of certain of the solenoid control valves for controlling the operation of the apparatus shown in FIG. 1.

Referring to FIGS. 2 and 7, the switches 77 to 80 may be included in circuits having solenoids 82, 83, 84 and 85 for operating valves 82', 83', 84' and 85'. The valves 82' to 85' may be provided with a common constant pressure inlet line 86. The outlet lines 87, 88, 89 and 90 of the valves 82' to 85' may lead to the hydraulic clutches 34 and 35 as shown in FIG. 1. It will be apparent that with the hand grip 108 in the position shown in FIGS. 3 and 6, the switch 77 is closed, energizing solenoid 82, providing communication from line 86 through valve 82' and line 87 to clutch 35 (FIG. 1), rendering gear 33 effective. Each successive movement of hand grip 108 through 90° from the position shown in FIG. 6 in a clockwise direction will successively close switches 80, 78 and 79, thereby rendering gears 31, 32 and 30 effective. Additionally, each 45° movement of hand grip 108 in a clockwise direction from any of the 90° positions will cause two of the switches to close, thereby causing the movement of the tool support 25 along a 45° path. Thus, turning grip 108 clockwise 45° from the position in FIG. 6 will cause switches 77 and 80 to close, thereby rendering effective gears 33 and 30 (FIG. 1) upon the admission of pressure fluid to lines 87 and 90.

Referring to FIG. 1, in order to control the flow of power through the variable speed transmission VS, means may be provided for moving the lever 51 between its various positions. In the embodiment disclosed, this means may comprise a reciprocable piston 110 that is connected to the lever 51. The movement of piston 110 may be effected by a servomechanism including a reciprocable cam 111 and a servo valve 112. The servo valve may include a spool 113 that is resiliently urged by a spring 114 into engagement with a cam 115 fixed to the one end of piston 110. Constant pressure and exhaust lines 116 and 117 are connected to the valve 112 such that the spool 113 blocks both when in its normal position or the position to which it returns after being displaced. Another line 118 is connected to valve 112 between the lines 116 and 117. Line 118 leads to the top of piston 110. A constant pressure line 119 continuously acts on piston 110 tending to return it to the position shown in FIG. 1; however, the area of piston 110 acted upon by pressure fluid from line 119 is less than that acted upon by presure fluid from line 118 so that the latter overcomes the former when it is effective.

The valve 112 may be pivotally mounted at 120 and it may include a cam roller 121 that follows a cam surface 122 on cam 111. With the parts in the condition shown in FIG. 1, the lever 51 is in its number 1 position, and the units 50 and 52 are rotating at maximum speed in one direction. Movement of the cam 111 upwardly will cause the valve 112 to pivot counterclockwise about pivot 120 by the action of spring 114 expending. This causes spool 113 to move leftwardly, establishing communication between lines 116 and 118 while maintaining exhaust line 117 closed. Accordingly, pressure liquid in line 118 forces piston 110 downwardly, moving arm 51 from its number 1 position toward its number 2 position until cam 115 forces spool 113 rightwardly to cut off communication between lines 116 and 118, at which point the pressure liquid within line 118 and above piston 110 is trapped, holding piston 110 and arm 51 in its new position.

As previously described, this causes the speed of the reactor 58 to decrease and that of the shaft 40 to increase from zero. Further upward movement of cam 111 causes the arm 51 to be moved downwardly through its number 2 position, thence to its number 3 position, at which point the follower roll 121 is at the low point of cam path 122 and the reactor 58 is rotating in a reverse direction at maximum speed. It is at this point that, due to the reduction gearing 69, 70, 72 and 73, shaft 40 has increased in speed from zero through its low speed range, and reactor 60 is conditioned to take over for the high speed range of operation of shaft 40. The arrangement is such that arm 66 is rotating at a speed slightly greater than that of shaft 40 so that clutch 74 can be shifted without tooth-on-tooth contact. Shifting of clutch 74 at the proper time is accomplished by a valve 123 having a valve stem 124 connected to the cam 111. When cam 111 is at a position in its upward travel such that the roll 121 is at the low point of cam surface 122, the head 125 of stem 124 establishes communication between lines 126 and 127, whereupon piston device 128 shifts clutch 74 into engagement with clutch element 75. Immediately, the faster rotating arm 66 takes over from the gear 73 because of the overriding clutch 73'.

Further upward movement of the cam 111 causes the roller 121 and valve 112 to move clockwise about pivot 120, thereby forcing spool 113 rightwardly, establishing communication between lines 118 and exhaust line 117, while still retaining line 116 blocked off. Accordingly, piston 110 begins to rise due to the pressure liquid in line 119 until cam 115 permits spool 113 to move leftwardly enough to close off exhaust line 117. This action of moving cam 111 upwardly may continue until arm 51 has returned to its number 1 position when shaft 40 is rotating at its maximum rate of speed.

Movement of the cam 111 downwardly from its uppermost position causes the shaft 40 to reduce in speed to zero when cam follower 121 is in the position shown in FIG. 1.

The reciprocation of the cam 111 during a metal removal operation of head 25 preferably should be related to the speed at which the table 10 is rotated by the conventional variable speed transmission 12'. During transverse movement of head 25, the movement of cam 111 should preferably be unrelated to the rotation of table 10. In the present embodiment, the function of relating head movement to table rotation has been accomplished by employing a servo drive 130 between the gear 38 and an auxiliary variable speed device 129 that is driven from the transmission 12' that drives the table 10. The servo drive 130 is in the form of an epicyclic gearing train.

The output shaft of the conventional variable speed transmission 12' drives a gear train 131 that in turn drives a shaft 132. The shaft 132 is connected to a shaft 133 that drives a shaft 134 through bevel gears 135 and 136. A flat disc 137 is fixed to shaft 134, and it frictionally drives a disc 138 that is fixed to a reciprocable shaft 139 having a square or splined cross section. With disc 138 in its solid line position at the center of disc 137, shaft 139 does not rotate. Movement of disc 138 toward its dot-and-dash position increases the speed of rotation of shaft 139 from zero to a maximum predetermined value.

The speed of rotation of shaft 139 is employed to drive, through bevel gearing 139', a sun gear 140 of the epicyclic gearing arrangement 130. The sun gear 140 meshes with planet gears 141 which in turn mesh with the internal teeth of a ring gear 142. The external teeth of ring gear 142 mesh with gear 38 that is driven from the output shaft 40 of the variable speed unit VS. The planets 141 are journaled on an arm 143 that drives through gear teeth 144 thereon, a gear train 145 including a hydraulically operable clutch 146. When the clutch 146 is effective, gearing 145 drives a shaft 147 to which is fixed a pinion 148 in mesh with a rack 149 integral with the cam 111.

With the parts in the condition shown in FIG. 1, the shaft 38 is not rotating, nor is shaft 139. Movement of disc 138 off its center position causes shaft 139 to rotate at a predetermined speed depending upon the distance that disc 138 is moved from center. Since gear 38 is not rotating, the rotation of sun gear 140 rotates arm 143 and hence shaft 147, provided, of course, that clutch 146 is effective. Rotation of shaft 147 may move cam 111 upwardly, thereby effecting the movement of lever 51 from its number 1 toward its number 2 position and hence starting the rotation of gear 38. When the speed of rotation of gear 38 arrives at a predetermined value, it will combine with the speed of rotation of the sun gear 140 and stop the rotation of arm 143. This, of course, stops the movement of cam 111 and also the movement of lever 51. By properly calibrating the offset positions of disc 138 with respect to the speeds of rotation of shaft 38, such positions can represent definite feed rates of movement of the head 25, each of which rates will be definitely related to the speed of rotation of the table 10.

Figure 1B:
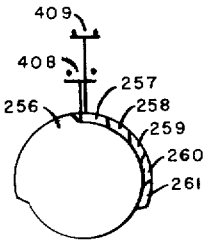
FIG. 1B is an end view of the cams shown in FIG. 1A.
Figure 1A:
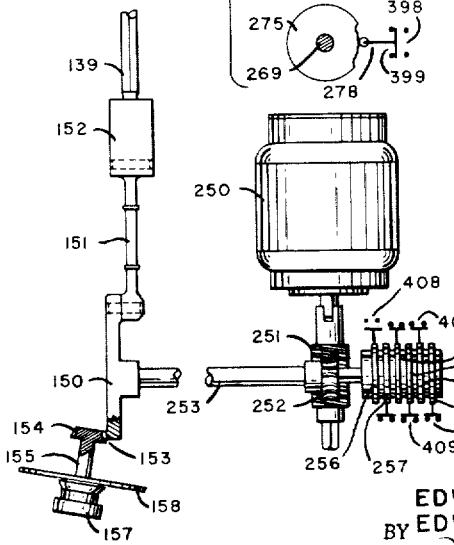
FIG. 1A is a view of certain of the elements of FIG. 1.

Referring to FIGS. 1 and 1A, reciprocation of shaft 139 may be effected by connecting it to an oscillatable member 150 through a connecting rod 151 and a non-rotatable connector 152 that permits rotation of shaft 139. The member 150 may be provided with bevel gear teeth 153 that mesh with a bevel pinion 154 on a shaft 155 to which is fixed a pointer 157 and a dial 158. The dial 158 may be marked to indicate the feed rates corresponding to the calibrated offset positions of disc 138. A reversing electric motor 250 may have a worm 251 fixed to its output shaft which meshes with a worm gear 252 fixed to a shaft 253 that is drivingly connected to the member 150. Contacts 254 and 255 (FIG. 14) may be provided for energizing motor 250 in a forward or a reverse direction. The contacts 254 and 255 may be mounted in any convenient place so that the operator may view the dial 158 when either of the switches 254 and 255 is closed. When the desired feed rate has been reached, as evidenced by the reading of the dial 158, the contact 254 or 255 is released. Shaft 253 is also connected to adjustable discs 256, 257, 258, 259, 260 and 261 which will be described later.

From the foregoing it is evident that setting of dial 158 will cause head 25 to move at a predetermined feed rate related to the rotation of the table 10 when the clutch 146 is rendered effective.

Referring to FIGS. 2 and 3, arm 105 is adapted to be moved a short distance in a counterclockwise direction, thereby turning shaft 107 without turning shaft 99. The flexible cable 102 bends to accommodate this movement. A cam 159 on shaft 107 includes a rise 160 (FIG. 2B). When arm 105 is in its righthand position (FIG. 3), rise 160 closes a switch 161 which energizes a feed clutch solenoid 162 (FIG. 7) that operates a solenoid valve 162'. Pressure fluid is permitted to flow from line 86 through line 164 to render effective clutch 146 (FIG. 1). In the neutral and transverse positions of the arm 105, switch 161 rides on cam surface 164' of cam 159 and remains open. Feeding motion of head 25 occurs along the path and in the direction represented by the position of hand grip 108, one of the rotary positions of which selectively closes one of the switches 77 to 80, inclusive. The cam 159 (FIG. 2B) on shaft 107 may also include a rise 166 that cooperates with a switch 167. The switch 167 is open by the rise 166 in the neutral position of the arm 105. When the arm 105 is moved rightwardly or leftwardly from its neutral position, switch 167 in series with solenoids 82 to 85 (FIG. 7) will close and ride on cam surface 164'. The closing of switch 167 renders effective the selected clutch 34 or 35 to cause the head 25 to move in the selected direction at the selected feed rate.

As previously explained, movement of the head 25 at traverse rates of speed preferably should not be related to the rotation of the table 10. In the embodiment disclosed, this has been accomplished by providing a separate, mechanically operable actuator for moving cam 111 independently of the epicyclic control gearing 130.

Referring to FIGS. 1, 4 and 5, a member 170 may be fixed to the cam 111 and may make a telescopic connection with a rod 171. The rod 171 may be threadingly connected to a nut 172 which is pivotally mounted on a lever 173, which itself is pivotally mounted at 174. The threaded rod 171 may include a square end 175 to receive a wrench.

Referring again to FIG. 1, the constant pressure inlet 126 of valve 123 includes a pass 176 that causes the constant pressure liquid to act on the head 125 of the stem 124, constantly urging cam 111 and rod 171 downwardly. The cam shaft 107 may include a lug 177 which stops the downward movement of rod 171 when a point 178 on lever 173 engages it. The only time that point 178 engages lug 177 is when the arm 105 is in neutral. By adjusting the threaded rod 171 through the square end 175, a predetermined lower position of cam 111 can be provided for a purpose to be described later.

The cam shaft 107 may also include a lever 179 having three pins 180, 181 and 182 thereon. These pins are adapted, respectively, to cooperate with cam surfaces 183, 184 and 185 formed on lever 173 as will be explained. Movement of the arm 105 in a clockwise direction (FIG. 3) for the first five degrees occurs before the pin 180 engages surface 183 on lever 173. This movement of arm 105 may be employed to provide a "creep" speed of the head 25 as preset by turning the threaded rod 171. At the neutral position of arm 105, the head 25 does not move because the switch 167 (FIG. 2B) is depressed, cutting off pressure fluid to line 164. It is to be noted that a feed speed can be selected that is less than the preset "creep" speed since movement of the arm 105 rightwardly (FIG. 3) causes lug 177 (FIG. 5) to move counterclockwise away from the point 178, thereby permitting rod 171 to move downwardly if required for a feed rate that is less than the preset "creep" speed.

Movement of arm 105 in a clockwise direction (FIG. 3), after pin 180 engages surface 183 on lever 173, causes rod 171 and consequently cam 111 to move upwardly, thereby effecting the movement of arm 51 toward its number 2 position to increase the speed of gear 38 and hence the speed of movement of head 25. This movement of cam 111 is independent of the epicyclic gearing 130 since switch 161 (FIG. 2B) is open, exhausting clutch 146 (FIG. 1). Continued movement of arm 105 in a clockwise direction successively causes pins 181 and 182 to engage surfaces 184 and 185 on lever 173, thereby increasing the speed of head 25 to its maximum traverse rate.

In order to provide a degree of feel to the actuation of the arm 105, the support 106 may include a cam surface 186. It may include notches 187, 188 and 189 on its periphery. A pivoted lever 190 may include a roll 191 adapted to ride on the cam surface 186. A plunger 192 may be urged into engagement with lever 190 by a source of constant pressure liquid from a line 193, past a check valve 194. An adjustable needle valve 195 may be employed to exhaust the cylinder for plunger 192 at a predetermined rate. The construction and arrangement of the parts are such that a definite resistance is felt when the arm 105 is in its "neutral," "feed" and "creep" positions. Furthermore, a controlled resistance to the increase in traverse speed of head 25 is felt by the controlled bleeding of the exhaust through the preset needle valve 195. An adjustable stop 196 may be provided for limiting the extent of clockwise movement of arm 105.

Figure 8:
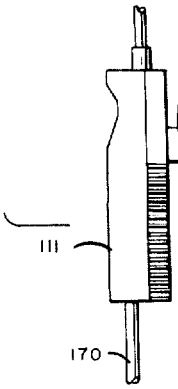
FIG. 8 is a view of certain elements that control other portions of the apparatus of FIG. 1.
Figure 8:
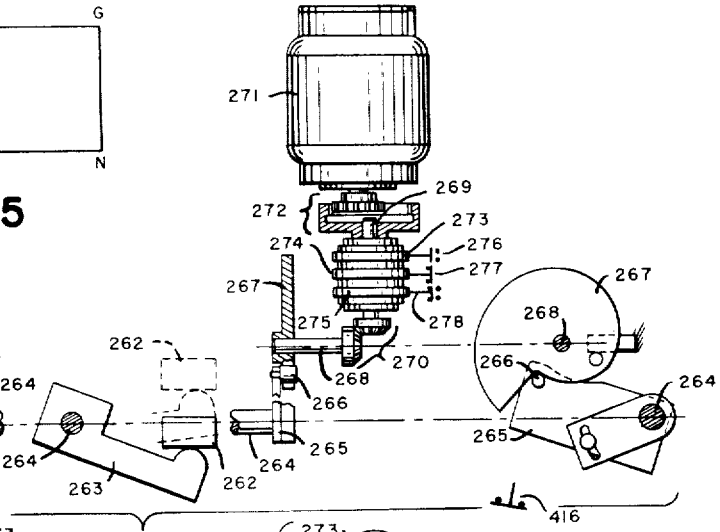
Figure 8A:
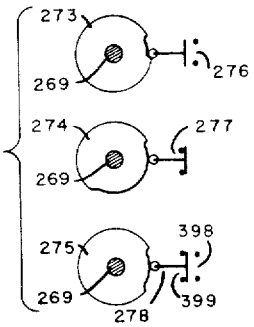
FIG. 8A is a showing of certain of the cams of FIG. 8.

Referring to FIG. 8, the cam 111 may be provided with an abutment 262 adapted to be engaged by a finger 263 fixed to a shaft 264. The shaft 264 may also suppport in fixed relation thereto another finger 265 having a cam follower 266 thereon. The follower 266 may engage the peripheral surface of a cam 267 that is fixed to a shaft 268. The constant pressure acting on valve stem 124 (FIG. 1) forcing cam 111 downwardly causes follower 266 (FIG. 8) to remain in contact with the surface of cam 267. Shaft 268 may be geared to a cam shaft 269 through bevel gearing 270, and cam shaft 269 may be driven by a reversible electric motor 271 through a gear reduction 272. Cams 273, 274 and 275 may be fixed to cam shaft 269 for actuating contacts 276, 277, 278 for a purpose to be described later.

Figure 9:
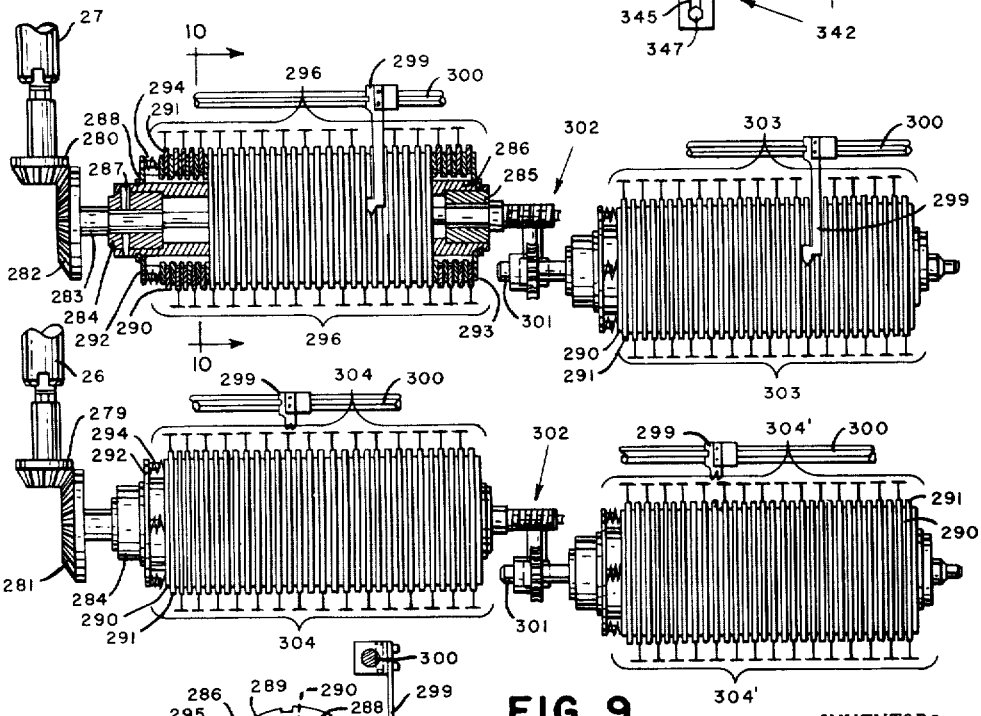
FIG. 9 is an elevational view of the discs for controlling the extent of movement of a movable member of the machine tool.

Referring to FIGS. 1 and 9, the shafts 26 and 27 are connected to bevel gears 279, 280 which mesh with bevel gears 281, 282. The gear 282 is connected to a shaft 283 having bosses 284 and 285 at each end thereof. A hollow cylindrical member 286 may be mounted on bosses 284 and 285, and a pin 287 may extend through one end of member 286, boss 284 and shaft 283. The peripheral surface of member 286 is provided with splines 288 for receiving mating internal splines 289 (FIG. 10) of a plurality of spacer discs 290 mounted on member 286. Between succeeding discs 290, an additional disc 291 may be located. The disc 291 may have a central hole that clears the splines on member 286 and therefore may be rotated relative to it and discs 290.

Figure 10:
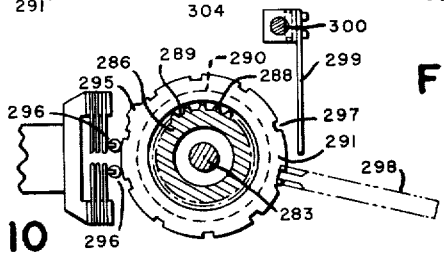
FIG. 10 is a sectional elevational view taken substantially along line 10—10 of FIG. 9.

Referring to FIG. 9, discs 292 and 293 may be fixed to opposite ends of the member 286. Resilient means 294 may be located between disc 292 and the first of the discs 290. Accordingly, all of the discs are resiliently urged into abutting relation with each other. However, discs 291 can be turned relative to each other and the spacer discs 290. Each of the discs 291 may include a cam 295 adapted to actuate a switch 296. In order to conserve space, the switches 296 are arranged to extend alternately upwardly and downwardly as shown in FIG. 10. The remaining portions of the periphery of discs 291 may be provided with spaced notches 297 for receiving a tool 298 for turning the discs 291 containing the cams 295. Indicating means such as fingers 299 may be mounted for sliding motion on bars 300 for facilitating the setting of discs 291. The pitch of the screw 23 (FIG. 1) may be such that one revolution of shaft 20 moves head 25 one-half inch, for example. The ratio of gears 280, 282 (FIG. 9) may be 1:2 so that it will take two revolutions of splined shaft 20 to rotate shaft 283 one revolution, which would equal one inch of vertical movement of head 25. Accordingly, the described discs on shaft 283 represent a fine setting in which a small motion of head movement represents a fairly large peripheral movement of a cam 295. Consequently, the cams 295 are relatively long peripherally in order to facilitate setting them.

The shaft 283 may be geared to another shaft 301 through worm gearing 302, which in the embodiment disclosed will be described as being 100:1. The shaft 301 may support another series of discs 290, 291 in the same way that shaft 283 supports such discs. The discs on shaft 301, however, rotate only 1/100 as much as the discs on shaft 283, so that these latter discs represent a means for roughly setting the point of motion termination of head 25.

There may be any number of switches 296, each having a corresponding disc 291 on shaft 283, and a corresponding number of switches 303 each having a corresponding disc 291 on shaft 301. The switches 296 and 303 are wired in [series (FIG. 14), only] *a manner such that those for corresponding discs 291 on shafts 283 and 301 are actuated in sequence, and both must be closed to establish a complete circuit. Only* two switches 296 and 303 [being] *are* shown in FIG. 14.

There is an identical arrangement of discs 291 and 290 adapted to actuate switches 304 and 304' for shaft 26 connected to screw 17 for controlling the horizontal motion of head 25.

Figure 12:
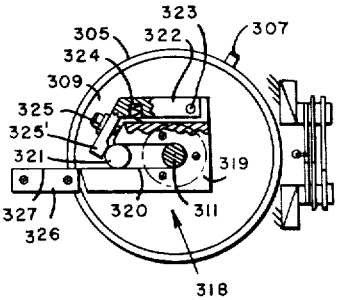
FIG. 12 is a view taken substantially along line 12—12 of FIG. 11.
Figures 11, 16:
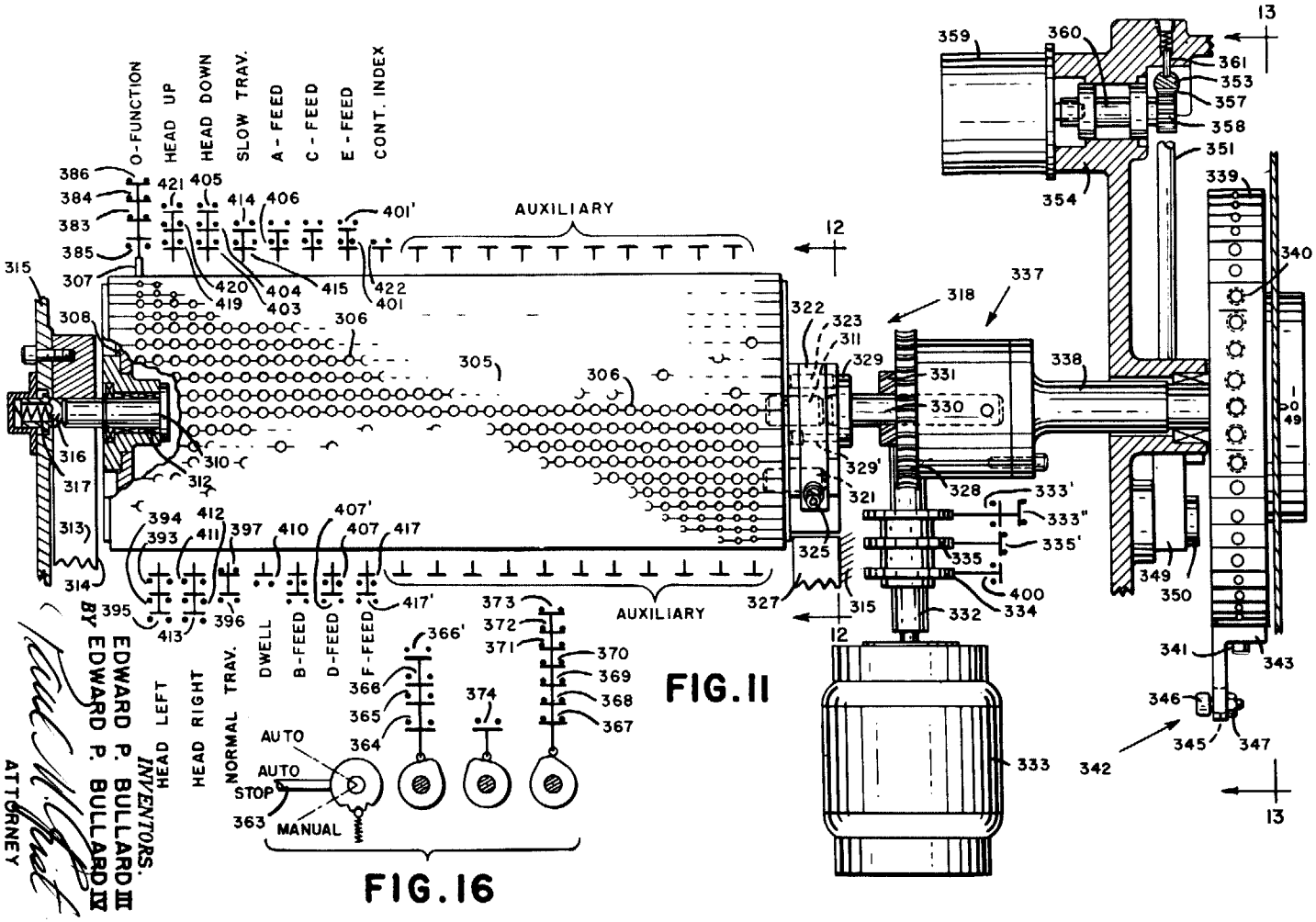
FIG. 11 is a view, partly in section, of the function data storage drum embodying the principles of the invention.
FIG. 16 is a view of certain cams and switches for automatic stop and manual control of the apparatus.

Referring to FIG. 11, a function drum 305 may be provided with peripherally spaced, linearly disposed rows of threaded holes 306 adapted to receive dogs 307 (FIG. 12). The drum 305 is provided with end walls 308 and 309 having axially aligned trunnions 310 and 311 in the centers thereof. Trunnion 310 is connected to end wall 308 through needle bearing 312, thus allowing drum 305 to rotate freely about its center. Trunnion 310 also extends over and cooperates with a path 313 on bracket 314 fixed to a housing 315. A plunger 316 that cooperates with spring 317 mounted in housing 315 urges the drum 305 with trunnions 310 and 311 rightwardly, abutting end wall 309 against a drive bracket 318. The drive bracket 318 comprises a U-shaped bracket 319 (FIG. 12) having a slot 320 that cooperates with trunnion 311 and a driving pin 321 which is radially located on the end wall 309 of the drum 305.

A bracket 322 pivotally mounted on the U-shaped bracket 319 by a pin 323 is urged upwardly against a screw head 325 by a spring 324. The screw 325 is bolted to the U-shaped bracket 319 with a rise 325' thereon abutting pin 321. From the foregoing it is evident that by tightening the screw 325, the bracket 322 is pivoted about the pin 323, thus causing the spring 324 to compress and the rise 325' to cooperate with the pin 321. This action urges trunnion 311 into its correct radial position in the slot 320. A bracket (not shown) similar to 322 abuts trunnion 310, urging trunnion 310 into its correct radial position on path 313. A bracket 326 (FIG. 12) is bolted to the housing 315 and is extended to the same length as bracket 314, thus providing paths 313 and 327 for facile mounting of the drum 305 within the housing 315.

Figure 13:
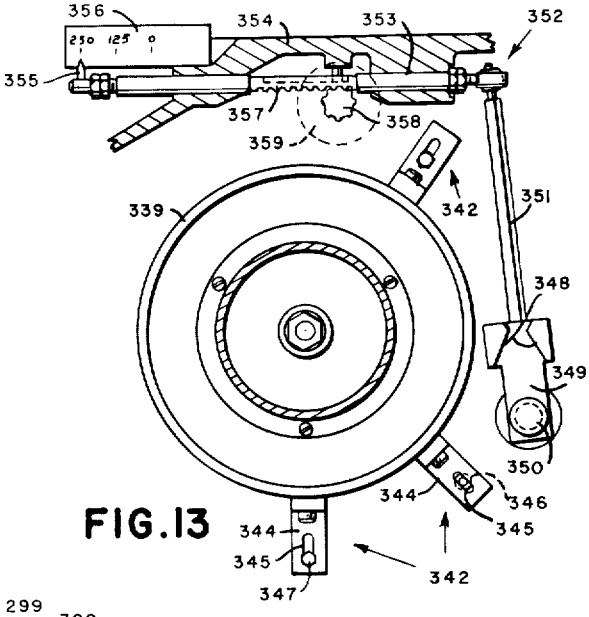
FIG. 13 is a view taken substantially along line 13—13 of FIG. 11.

The U-shaped bracket 319 is connected to a flange 329 by screws 329'. The flange 329 is fixed to a shaft 330 that is connected to a worm wheel 328. The worm wheel 328 meshes with a worm 331 on a shaft 332 that is connected to an electric motor 333. Because of the gear ratio between worm wheel 328 and worm 331, a half revolution of shaft 332 will cause the function drum 305 to rotate to its next index position. Cams 334 and 335 effect the energizing of the motor 333 for indexing of the drum 305 and will be described at a later time. The function drum 305 with its selected dogs 307 will actuate switches for selecting a traverse rate, a feed rate and a direction for the head 25 (FIG. 1), as well as certain auxiliary functions. The worm wheel 328 is also connected to a shaft 338 through a coupling 337. The shaft 338 is fixed to a disc 339 with threaded holes 340 peripherally arranged about its outer surface at equal intervals. These threaded holes are adapted to receive a screw 341 for supporting an adjustable selection bracket 342. The threaded holes 340 on disc 339 are in line with the linearly disposed rows of threaded holes 306 on the drum 305. The bracket 342 comprises a short leg 343, that is fixed to disc 339 by screw 341, and a long leg 344 (FIGS. 11 and 13). The long leg 344 has a slot 345 that adjustably supports a roller 346. It is evident that the roller 346 may be adjusted in slot 345 and locked in place by a nut 347. The roller 346 cooperates with a cam 348 on a bracket 349. One end of the bracket 349 is mounted at a pivot point 350 and the other end of the bracket 349 is connected to one end of a rod 351. The opposite end of rod 351 makes a ball and socket connection with a rod 353, the latter being slidably mounted in bearings within housing 354. The rod 353 supports at its free end a pointer 355 that cooperates with a linear scale 356 for indicating table speed. A rack 357 forming part of rod 353 meshes with a pinion gear 358 that is connected to a potentiometer 259 (FIG. 11) through shafting 360. A spring-loaded pin 361 is provided in housing 354 to keep the rack 357 and the pinion gear 358 in mesh. From the foregoing it is evident that adjusting the roller 346 in slot 345 will affect the position of cam 348, thus causing rod 351 to pivot about pivot point 350. In so doing, the rod 353 will move rightwardly or leftwardly depending on the adjustment of the previously acting roller 346, thereby causing the shafting 360 to rotate. This operates the potentiometer 359 which is arranged in a bridge circuit including another potentiometer 359' (FIG. 1). When these potentiometers are unbalanced, a motor 361' is energized, causing rotation of a cam shaft 362 that may be employed to operate electrical switches or hydraulic valves (not shown) for changing the output speed of the headstock transmission 12' in a known manner.

Figure 15:
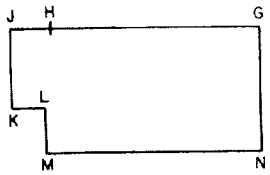
FIG. 15 is a diagram of a simple program of operations.

In order to understand the operation of the apparatus and the electrical diagram of FIG. 14, a relatively simple program cycle of operations will be described. Referring to FIG. 15, assume that it is desired to move the head 25 from the point G at a normal, rapid traverse speed leftwardly along a horizontal path to point H, thence at a predetermined feed speed along the same path to point J to position a tool to cut along a vertical path. Next, head 25 is moved at another finer feed rate vertically downwardly to point K where it dwells, thence at a slow traverse speed rightwardly along a horizontal path to point L, thence vertically downwardly at a coarser feed rate to point M, thence rightwardly along a horizontal path at normal traverse rate to point N, and finally upwardly along a vertical path at a normal traverse rate to point G, after which drum 305 is continuously indexed to its zero or starting position.

The drum 305 is shown as having thirty-six circumferentially extending, axially spaced rows of threaded holes 306. The fifteen rows starting from the lefthand side of drum 305 are shown as being aligned with switches having specific functional designations. Each of the twenty-one remaining rows of holes is shown as being aligned with a switch. These twenty-one switches may be employed for auxiliary functions such as turret index, initiating other similar program controls for other tool heads on the same or other machines, coolant, as well as attachments for performing specific machining operations. In FIG. 11, the switches are shown in alternate arrangement for clarity, disposed 180° relative to alternate switches. Actually, all switches are in axial alignment. The arrangement of the holes 306 provides axially extending, circumferentially spaced rows of holes numbered "0" to "50" which comprise stations to which the drum 305 is indexed in a step-by-step fashion.

Initially the drum 305 may be preset off the machine. The zero or starting index position is provided with a dog 307 in the first circumferentially extending row of holes 306. The number 1 index station will include axially aligned dogs 307 at the second and sixth circumferential rows of holes 306; the number 2 index station includes dogs at the second and thirteenth circumferential rows of holes 306; the number 3 index station includes dogs 307 at the fifth, eighth and twelfth circumferential rows of holes 306; the number 4 index station contains dogs 307 at the fourth, six and seventh circumferential rows of holes 306; the number 5 index station includes dogs 307 at the fifth and fourteenth circumferential rows of holes 306; the number 6 index station contains dogs 307 at the fourth and sixth circumferential rows of holes 306; the number 7 index station includes dogs 307 at the third and sixth circumferential rows of holes 306; and the number 8 index station as well as all remaining stations includes dogs 307 at the fifteenth circumferential row of holes 306. The preset drum 305 is then mounted within the brackets 314 and 318 so that the zero index station is in position such that its dog 307 is effective.

Figure 14:
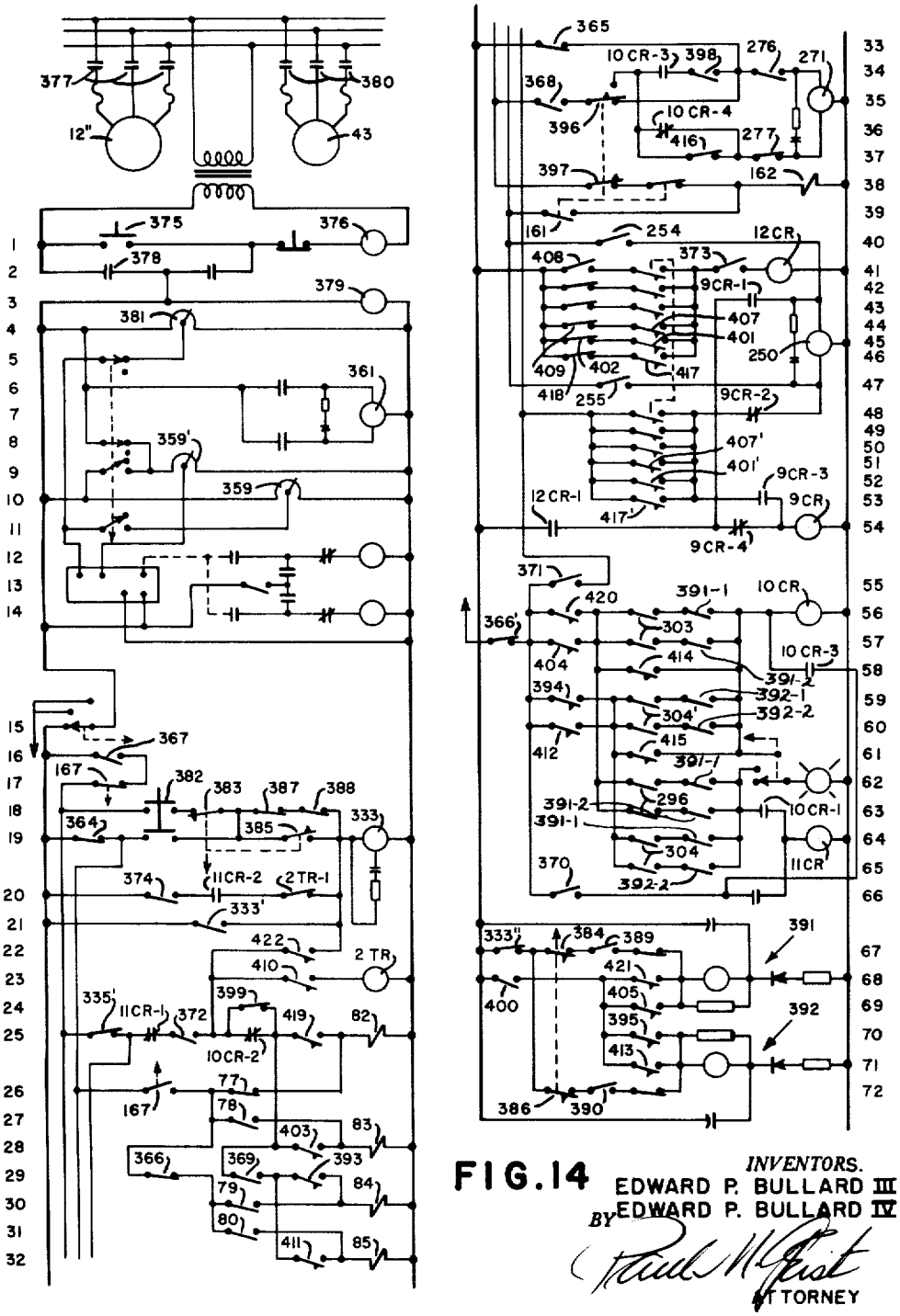
FIG. 14 is a wiring diagram for the apparatus shown in FIGS. 1 through 12.
Figure 17:
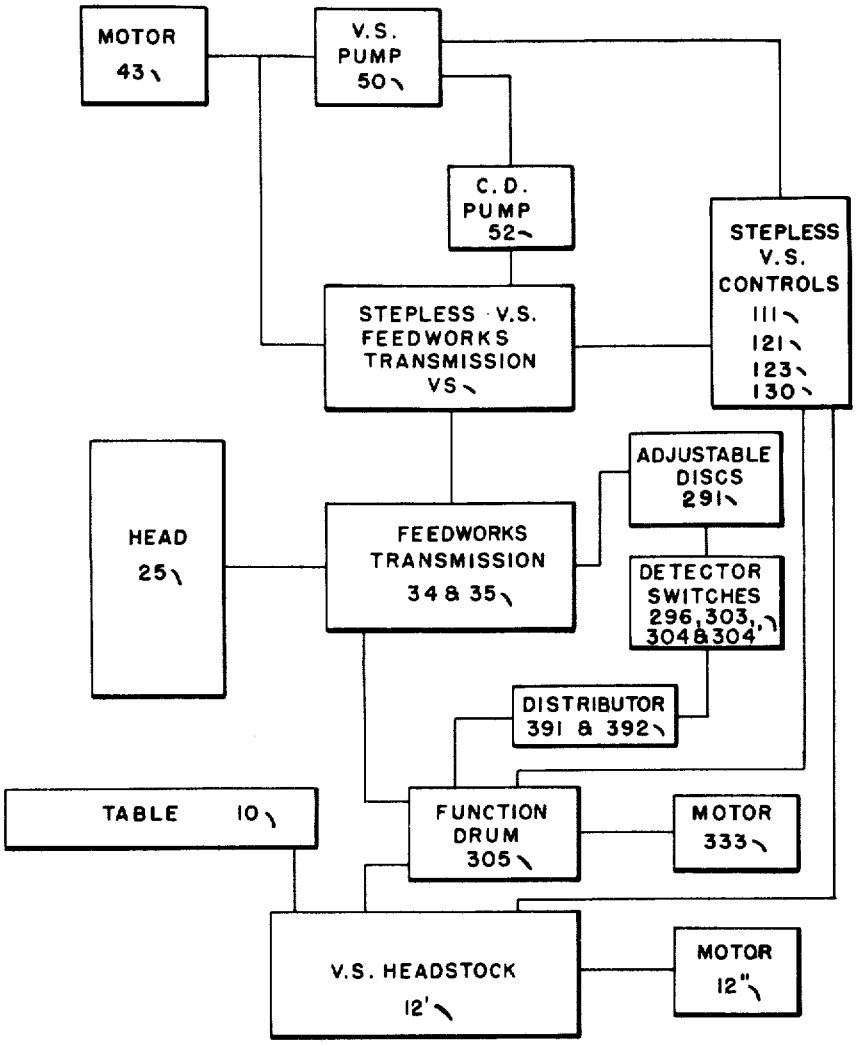
FIG. 17 is a block diagram of the apparatus.

The following discussion will contain parenthetical numerals which refer to the lines on FIG. 14 of the location of the contacts and switches mentioned herein.

Referring to FIGS. 14 and 16, a handle 363 is moved to its manual position closing switches 364, 365 and 366 (19, 33, 29); opening switches 367 to 373, inclusive (16, 35, 29, 66, 55, 25 and 41); and opening switch 374 (20).

With arm 105 (FIG. 3) in neutral, closing switch 375 (1) energizes relay 376 (1), closing contacts 377 for main motor 12'' and closing contacts 378 (2), energizing relay 379 (3) closing contacts 380 for motor 43, and supplying power for the entire circuit.

With head 25 at the point G (FIG. 15), manual adjustment of potentiometer 381 (4) acts to start the rotation of motor 361' (7), and potentiometer 381 is adjusted to a desired speed as indicated on a dial (not shown) associated with the potentiometer 381. This causes cam shaft 362 (FIG. 1) to operate means for effecting the desired output speed of headstock transmission 12'. When the desired speed is attained, the potentiometer 359' (9) balances the potentiometer 381 (4), causing stopping of motor 361' (7).

The handle 108 is turned so that it points leftward, and arm 105 is moved leftwardly to effect maximum traverse movement of head 25 from the point G (FIG. 15) to point H whereupon arm 105 is returned to neutral. The number 1 disc 291 on the lefthand side of the group associated with the switches 304 (FIG. 9) is set to close its corresponding switch. The number 1 disc 291 on the lefthand side of the group associated with the switches 304' is then set to close its corresponding switch, and then is backed off an amount representing less than one inch of movement of head 25.

With a predetermined feed rate set manually by operating motor 250 (46), the arm 105 is moved rightwardly with the pointer on handle 108 still pointing leftward causing head 25 to feed leftwardly until it reaches point J (FIG. 15). The second disc 291 from the left of the group associated with switches 304 is set to close its corresponding switch, and the second disc 291 from the left of the group associated with switches 304' is set to close its corresponding switch and is then backed off an amount representing less than one inch of head movement.

In order to test the preset condition of the discs 291 for accuracy of tool position at point J, a feature of the invention is employed which is known as automatic stop. The head 25 is moved rightwardly to a point between J and H. The handle 363 (FIG. 16) is manually moved to its horizontal position identified as "Auto Stop." The various switches are then in the condition shown in FIG. 16 with switch 374 open. Then by closing a manual switch 382 (18) twice, drum 305 indexes from the zero or start position to index station number 2, causing head 25 to feed leftwardly, and when the switch 304' for the second disc 291 is closed, a relay 10CR (56) is energized closing contacts 10CR–1 (63), thereby setting up the circuit for the switch 304 corresponding to the second disc 291. Finally, when the second switch 304 closes, relay 11CR (64) is energized, opening 11CR–1 contact (25) which deenergizes all directional solenoids, thereby stopping the head but not indexing the drum 305 because switch 374 (20) is open. Should the position of the tool be inaccurate, a correction can be made by adjusting the second disc 291 (from the left) for the switch 304.

The handle 108 (FIG. 6) is turned so that its pointer points downward, and the arm 105 is moved rightwardly, causing the head 25 to move down at a finer feed rate which may be set manually as previously described. When the head 25 reaches the point K, the arm 105 is moved to its neutral position and the number 1 discs 291 (from the left) of those associated with the switches 296 and 303 are set in the same way as such discs were set for the switches 304 and 304'.

The handle 108 is then turned so that its pointer points rightward, and arm 105 is moved leftwardly, causing head 25 to move rightwardly at traverse speed until head 25 reaches point L whereupon arm 105 is moved to its neutral position. The third disc 291 (from the left) for switch 304 is set in the same manner as the first disc 291 was set. The disc 291 for the third switch 304' is not set, for a purpose to be explained later.

The handle 108 is turned so that its pointer points downward, and arm 105 is moved rightwardly, causing head 25 to move downwardly at a coarser feed rate which may be set manually as previously described. When head 25 reaches point M, the arm 105 is moved to its neutral position, and the number 2 discs 291 (from the left) for the switches 296 and 303 are set in the manner previously described when head 25 was at point K.

The handle 108 is then turned so that its pointer points rightward, and arm 105 is moved to the left, causing head 25 to traverse to the right until it reaches point N whereupon arm 105 is moved to neutral. The fourth discs 291 (from the left) for the corresponding switches 304 and 304' are then set in the same way that the discs 291 for point H were set.

The handle 108 is then turned so that its pointer points upward, and arm 105 is moved to the left, causing head 25 to move upwardly to the starting point G when arm 105 is moved to neutral. The third discs 291 (from the left) for the corresponding switches 296 and 303 are then set in the same way that the discs 291 were set at point N. The switch 382 (18) is then held closed until the function drum 305 indexes to its zero or starting position.

The control is now in condition to perform the cycle of movements automatically. The lever 363 (FIG. 16) is then moved to its upper position. This leaves switches 364 to 366 open and closes switches 367 to 374, inclusive. At the zero index position of drum 305, switches 383 (18), 384 (67) and 386 (72) are closed by a dog 307, and switch 385 (19) is opened. Additionally, when drum 305 is at its zero index position, switches 387 and 388 (18) are closed and switches 389 (67) and 390 (72) are opened by the action of stepping relay distributors 391 (68) and 392 (71). *The stepping relay distributor 391 includes two contacts for each stepping position, only two steps being shown, i.e., 391–1 (56, 62) and 391–2 (57, 63). Likewise stepping relay distributor 392 includes two contacts for each stepping position, only two steps being shown, i.e., 392–1 (59, 64) and 392–2 (60, 65).*

Closing manual switch 382 (18) energizes index motor 333 (19), causing drum 305 to index to its number 1 position. The dog 307 at station 1 closes switches 393 (29), 394 (59) and 395 (70). Also, at index station 1, switches 396 (35) close and switch 397 (38) opens. Accordingly, motor 271 (35) (FIG. 8) is energized, causing movement of cam 111 to increase the speed of gear 38 (FIG. 1) until switch 277 (37) opens, thereby deenergizing motor 271 and head 25 moves at maximum traverse rate. Closing switch 393 (29) energizes solenoid 84 (30) (FIG. 7), causing head 25 to move leftwardly. Closing switch 394 (59) sets up the circuit for the horizontal coarse and fine detector switches 304', 304 (59–60; 64–65). Closing switch 395 (70) sets up the circuit for the horizontal stepping distributor 392 (71). As previously described, at the zero index station, switch [384 (67)] *390 (72)* is closed, energizing the distributor stepping switch [391 (68)] *392 (71)* indexing the stepping switch distributor to its number 1 position *closing switch 392–1*. Accordingly, head 25 moves leftwardly until the switch 304' closes *that is in series with switch 392–1*, said switch *304'* corresponding to the number 1 (from left) disc 291. Closing this 304' switch energizes the 10CR relay (56), closing 10CR–1 contacts (63), thereby setting up 11CR relay (64). Energizing the 10CR relay (56) also opens 10CR–2 contacts (25), thereby de-energizing solenoid 84 (30) and stopping the movement of head 25. Energizing 10CR relay (56) also closes 10CR–3 contacts (34) and opens 10CR–4 contacts (36). This reverses the rotation of motor 271 (35), decelerating the speed of gear 38 (FIG. 1) until it is at a speed which would move head 25 at one inch per minute or less, at which time switch 398 (34) opens, stopping motor 271, and switch 399 (24) closes. Closing switch 399 re-energizes solenoid 84 (30), thereby restarting movement of head 25 at one inch per minute or less. This continues until switch 304 corresponding to the number 1 disc 291 (from the left) is closed *which is in series with the 392–1 switch that is closed by stepping switch 392 being at its number 1 position.* [when] *When this occurs, the* 11CR relay 64 is energized, opening 11CR–1 contacts (25), thereby deenergizing solenoid 84 (30) and stopping the movement of head 25. Also, the 11CR–2 contacts (20) close, energizing motor 333 (19) (FIG. 11), thereby indexing drum 305 to its number 2 index station. As the drum 305 indexes, switch 396 (35) moves to its lower position, thereby energizing motor 271 (35), decelerating the speed of gear 38 (FIG. 1) until cam 273 (FIG. 8) opens switch 276 (34), thereby stopping motor 271 when gear 38 is at zero speed.

As the motor 333 rotates to index drum 305, cam 334 (FIG. 11) closes a switch 400 (68), thereby energizing the horizontal distributor stepping switch 392 (71) to set up the next horizontal coarse and fine detector switches 304' and 304.

At station 2 of drum 305 the direction selection switches for leftward movement of head 25 are again actuated, and the only difference between function 1 and function 2 is that in the latter, a feed rate selection E is employed instead of normal traverse. Accordingly, a dog 307 closes a switch 401 (45) and a switch 401' (52). Assuming that the previous feed rate setting is less than E, closing switch 401 energizes the 12CR relay (41) which closes 12CR–1 contacts (54), energizing 9CR relay (54) whereupon 9CR–1 contacts (43) close and 9CR–2 contacts (48) open. Accordingly, motor 250 (45) (FIG. 1A) is energized which rotates cams 256–261 in a counterclockwise direction, displacing disc 138 (FIG. 1) to increase the speed of movement of head 25 until cam 260 opens switch 402 (45), thereby de-energizing motor 250 (45) by de-energizing relay 12CR. Accordingly, head 25 moves leftwardly until the number 2 disc 291 (from the left) closes its switch 304' (*switch 392–2 being closed by distributor 392 having indexed to its second position*), thereby energizing 10CR relay (56) which opens 10CR–2 contacts (25). However, since the feed rate E is less than one inch per minute, switch 399 (24) remains closed and the clutch solenoid 84 (30) remains energized. The head 25, therefore, continues to feed leftwardly at rate E until the number 2 disc 291 (from the left) closes its switch 304 (*392–2 being closed since 392 is at its second position*), energizing 11CR relay (64), opening 11CR–1 contacts (25), de-energizing solenoid 84 (30) and stopping head 25 at point J (FIG. 15).

As previously described at the end of function 1, the drum 305 is now indexed from its number 2 to its number 3 station and the horizontal distributor stepping switch 392 (71) is indexed to its number 3 position. It is noted that at this point the vertical distributor stepping switch 391 (68) is at its number 1 position, having been moved there when drum 305 was at its zero station. During indexing of drum 305 to its number 3 station, the cam 335 (FIG. 11) opens switch 335′ (25), thereby de-energizing 9CR relay (54), hence opening 9CR–1 contacts (43) and closing 9CR–2 contacts (48), setting up motor 250 (45) for another feed selection when called for by a dog 307 on drum 305.

As previously explained, there are dogs 307 at the fifth, eighth and twelfth circumferential rows of holes 306 on drum 305. The dog 307 at the fifth row closes switches 403 (28), 404 (57) and 405 (69) which set up circuits for moving head 25 downwardly, conditioning the vertical detector switches 296 (62), 303 (56); and conditioning the vertical distributor stepping switch 391 (68) in the same way that closing switches 393 (29), 394 (59) and 395 (70) at stations number 1 and 2 set up circuitry for causing head 25 to move leftwardly and the corresponding conditioning of the horizontal detector switches 304′, 304 (59, 64) and the horizontal stepping distributor 392 (71).

The dog 307 at the twelfth row of holes closes switches 407 (44) and 407′ (50). Closing switch 407′ energizes motor 250 (45), causing it to rotate cams 256—261 in a clockwise direction until cam 259 closes switch 409 (44), energizing 12CR relay (41) closing contacts 12CR–1 (54), thereby energizing 9CR relay (54) which in turn closes 9CR–1 contacts (43) and opens 9CR–2 (48). The motor 250 then rotates in a counterclockwise direction until cam 259 re-opens switch 409, stopping motor 250. The purpose of the reverse rotation of motor 250 is to remove the backlash in the gearing so that the feed rate will be accurate and unaffected by backlash.

Dog. 307 at the eighth row closes a switch 410 (23), energizing a time delay relay 2TR (23) which opens 2TR–1 contacts (20). When head 25 reaches point K (FIG. 15), the 10CR and 11CR relays (56, 64 are energized by discs 291 as previously described. Energizing 11CR relay opens 11CR–1 contacts (25) which deenergizes solenoid 83 (28), stopping the downward movement of head 25. Also, the 2TR timer (23) is de-energized and after a preset interval, contacts 2TR–1 (20) close, causing drum 305 to index to station number 4, and indexing of the vertical distributor stepping switch 391 (68) to its number 2 position.

There are dogs 307 at the fourth, sixth and seventh rows of holes on drum 305. The dog 37 at the fourth row closes switches 411 (32), 412 (60) and 413 (71) which set up circuitry for moving head 25 rightwardly, conditioning the horizontal distributor switches 304′, 304, and conditioning the horizontal distributor stepping switch 392 in the same way that closing switches 393, 394 and 395 at station number 1 sets up circuitry for causing head 25 to move leftwardly and the corresponding conditioning of the horizontal detector switches 304′, 304 and the distributor switch 392.

The dog 307 at the sixth row moves switch 396 (35) to its upper position and opens switch 397 (38); and the dog 307 at the seventh row closes switch 414 (58) and switch 415 (61). Closing switch 415 energizes the 10CR relay (56), thereby opening contacts 10CR–4 (36). With switch 396 (35) in its upper position, motor 271 (35) rotates to increase the speed of movement of head 25 until it reaches about 0.9 inch per minute, when switch 416 (37) opens, stopping motor 271, and head 25 continues moving at a slow traverse rate of 0.9 inch per minute until it reaches point L (FIG. 15) whereupon the third disc 291 (from left) closes its switch 304, energizing relay 11CR (64) which effects the indexing of drum 305 to its fifth station and the indexing of distributor switch 392 (71) to its number 4 position in a manner previously described. Of course, indexing drum 305 causes motor 271 (35) to reduce the speed of gear 38 (FIG. 1) to zero as hereinbefore explained.

The fifth station of drum 305 includes dogs 307 at the fifth and fourteenth circumferential rows of holes. The dog 307 at the fifth row [now] closes switches 403 (28), 404 (57) and 405 (69) which set up circuitry for moving head 25 downwardly, conditioning the vertical detector switches 296, 303 and conditioning the vertical distributor stepping switch 391 (68) in the same way that these switches were closed at index station number 3. The dog 307 at the fourteenth circumferential row of holes on drum 305 closes switches 417 (46) and 417′ (53). Closing switch 417 energizes motor 250 (45) as previously described, causing it to rotate cams 256—261 in a counterclockwise direction, increasing the speed of gear 38 (FIG. 1) until cam 261 (FIG. 1A) opens switch 418 (46), stopping motor 250 with the head 25 moving downward at the F speed rate. When head 25 reaches point M (FIG. 15), the discs 291 for switches 296 and 303 cause indexing of drum 305 to its station number 6 and effect indexing of the vertical distributor switch 391 to its number 3 position.

The sixth station of drum 305 includes dogs 307 at the fourth and sixth circumferential rows of holes on said drum. The dog 307 at the fourth row closes switches 411, 412 and 413 which set up circuitry for moving head 25 rightwardly, conditions the horizontal detector switches 304′, 304 and conditions the horizontal distributor switch 392 in the same way that these switches were closed at index station number 3. The dog 307 at the sixth row moves switch 396 (35) upward and opens switch 397 (38) as explained before. This causes head 25 to move rightwardly at maximum traverse speed until switches 304′ and 304 become effective to stop head 25 at point N (FIG. 15), to index drum 305 to its seventh station, and to index horizontal stepping distributor switch 392 to [tis] *its* number 4 position. The seventh station of drum 305 includes dogs 307 at the third and sixth circumferential rows of holes in said drum. The dog 307 at the third row closes switches 419 (25), 420 (56) and 421 (68). Closing switch 419 (25) energizes solenoid 82 (25), causing head 25 to move upwardly. Closing switches 420 and 421 conditions the vertical detector switches 296 and 303 and conditions the vertical distributor switch 391 (68) as previously described. The dog 307 at the sixth row moves switch 369 (35) upwardly and opens switch 397 (38). This causes gear 38 to rotate at maximum traverse speed as described, and when head 25 reaches the starting point G, the drum 305 is indexed to its eighth station and vertical distributor switch 391 (68) indexes to its fourth position.

Station number 8 of drum 305, as well as all other remaining stations except the zero station, includes dogs 307 at the fifteenth row of circumferential holes. These dogs successively close a switch 422 (22), causing drum 305 to index to its next succeeding station.

When drum 305 returns to its zero station, switches 384 (67) and 386 (72) close, causing the vertical and horizontal distributor stepping switches to index to their number 1 positions, there being no zero station for them. At the number 1 positions, switches 389 (67) and 390 (72) open, stopping the indexing of said distributor switches. The control is now in condition to initiate another cycle by closing switch 382 (18).

Although the various features of the new and improved control have been shown and described to fully disclose one embodiment of the invention, it will be evident that changes may be made in such details and certain features may be used without others without departing from the principles of the invention.

What is claimed is:

1. Apparatus comprising in combination, a member; driving means connected to said member for moving said member in either direction at any one of a plurality of speeds along a path of travel; function data storage means connected to said driving means, adapted to be indexed from station to station and to be preset at each station with means adapted to actuate means to cause said apparatus to produce any function of which it is capable; a group of separately adjustable discs connected to said member and movable in proportion to the movement of said member such that a single revolution of said discs is accompanied by the movement of said member over a small unit of motion; another adjustable disc coresponding to each disc of said group, and connected to said group by gearing having a ratio such that a single revolution of said other discs represents the total travel of said member; a separate switch means mounted in cooperating position with each disc of said group and connected [in series with] *to* another switch means mounted in cooperating position with each corresponding other disc; and means connected to said data storage means and responsive to the [effectiveness] *sequential closing* of said [series arranged] switch means, upon the completion of a function preset at an index station on said function data storage means, for indexing said function data storage means to its next succeeding station.

2. Apparatus comprising in combination, a member; driving means connected to said member for moving said member in either direction at any one of a plurality of speeds along a path of travel; function data storage means connected to said driving means, adapted to be indexed from station to station and to be preset at each station with means adapted to actuate means to cause said apparatus to produce any function of which it is capable; a splined shaft connected by gear means to the means for moving said member such that one revolution of said splined shaft corresponds to a small unit of movement of said member; spacer discs splined to said shaft; discs between said spacer discs, individually rotatable independently of said splined shaft; resilient means supported by said splined shaft, urging said spacer and other discs into frictional engagement with each other; and other splined shaft connected to said first-mentioned splined shaft through gearing such that one revolution thereof corresponds to the total travel of said member along its path of travel; a corresponding spacer disc and a corresponding disc mounted on said other splined shaft in the same manner as those mounted on said first-mentioned splined shaft; [series arranged] *sequentially operated* switches mounted in cooperating position with corresponding discs on said splined shafts; and means connected to said data storage means and responsive to the [effectiveness] *sequential* closing of said [series arranged,] switches, upon the completion of a function preset at an index station on said function data storage means, for indexing said function data storage means to its next succeeding station.

3. Apparatus comprising in combination, a member; driving means connected to said member for moving said member in either direction at any one of a plurality of speeds along intersecting paths; function data storage means connected to said driving means, adapted to be indexed from station to station and to be preset at each station with means adapted to actuate means to select the path, direction and rate of movement of said member; a group of discs for each path of movement of said member connected to said member and movable in proportion to the movement of said member such that a single revolution of said discs is accompanied by the movement of said member over a small unit of motion along the corresponding path of motion for said group of discs; another disc corresponding to each disc of both groups of discs, connected by gearing to its corresponding group at a ratio such that a single revolution of said other discs represents the total travel of said member along the corresponding path of motion for said other discs; switch means for each disc of each group as well as a switch means for its corresponding other disc, the switch means for corresponding discs being [connected in series] *adapted to be sequentially operated* and mounted in cooperating position with their respective discs; and means connected to said data storage means and responsive to the [effectiveness of the series arranged] *sequential closing of said* switches for each disc of each group and its corresponding other disc, upon the completion of a function preset at an index station on said function data storage means, for indexing said function data storage means to its next succeeding station.

4. Apparatus comprising in combination, a member; driving means connected to said member for moving said member in either direction at any one of a plurality of speeds along intersecting paths; function data storage means connected to said driving means, adapted to be indexed from station to station and to be preset at each station with means adapted to actuate means to select the path, direction and rate of movement of said member; separate splined shafts connected to the means for moving said member along said intersecting paths such that one revolution of each corresponds to a small unit of movement of said member along the corresponding path; spacer discs splined to said shafts; discs between said spacer discs, individually rotatable independently of their corresponding splined shaft; resilient means supported by said splined shafts, urging said spacer and other discs into frictional engagement with each other; separate other splined shafts, one for each of said first-mentioned splined shafts, [geared] connected to its corresponding first mentioned splined shaft by gearing having a ratio such that one revolution thereof corresponds to the total travel of said member along the corresponding path of travel; spacer discs and discs between said spacer discs mounted on each of said other splined shafts in the same way that said discs are mounted on said first-mentioned splined shafts; [series arranged] *sequentially operated* switches mounted in cooperating position with the corresponding discs on each of the splined shafts for each path of travel of said member; and means connected to said data storage means and responsive to the [effectiveness of said series arranged] *closing of said sequentially operated* switches for the discs on the splined shafts for each path of travel of said member, upon the completion of a function preset at an index station on said function data storage means, for indexing said function data storage means to its next succeeding station.

5. Apparatus comprising in combination, a member; driving means connected to said member for moving said member in either direction along intersecting paths of movement at any one of a plurality of speeds; function data storage means connected to said driving means, adapted to be indexed from station to station and to be preset at each station with means adapted to actuate means to cause said member to move in either direction along one of said paths at a predetermined rate of speed; distance data storage means connected to said driving means for each path of movement of said member, including a plurality of switches and switch actuators adapted to be preset for determining the terminal position of said member and to energize means for indexing the function data storage means; separate distributor stepping switches connected to the electrical switches for each path of movement; and means connected to said function data storage means and responsive to the rendering effective of one of said electrical switches due to the movement of said member along the corresponding path for indexing the corresponding distributor stepping switch and said function data storage means.

6. Apparatus comprising in combination, a member; driving means connected to said member for moving said member in either direction at any one of a plurality of speeds along intersecting paths; function data storage means connected to said driving means, adapted to be indexed from station to station and to be preset at each station with means adapted to actuate means to select the path, direction and rate of movement of said member; a group of discs for each path of movement of said member connected to said member and movable in proportion to the movement of said member such that a single revolution of said discs is accompanied by the movement of said member over a small unit of motion along the corresponding path of motion for said group of discs; another disc corresponding to each disc of both groups of discs, connected by gearing to its corresponding group at a ratio such that a single revolution of said other discs represents the total travel of said member along the corresponding path of motion for said other discs; switch means for each disc of each group as well as a switch means for its corresponding other disc, the switch means for corresponding discs being [connected in series] *adapted to be sequentially operated* and mounted in cooperating position with their respective discs; separate distributor stepping switches connected to the [series arranged] *sequentially operated* switches for each group of discs and their corresponding other discs; and means connected to said function data storage means and responsive to the [effectiveness of the series arranged] *closing of said sequentially operated* switches of each group for indexing the corresponding distributor stepping switch and said function data storage means.

7. Apparatus comprising in combination, a member; a steplessly variable speed transmission connected to said member for moving said member in either direction along a path of travel at any one of a plurality of speeds; an integrator connected to means for adjusting said transmission; a motor drivingly connected to said integrator to vary the speed of said transmission; a control circuit including a pair of series connected switches for energizing said motor for each of a predetermined number of speeds of said transmission; separately adjustable cam means drivingly connected to said motor and normally maintaining one of each pair of switches closed; and means mounted in cooperating position relative to the other of said pairs of switches, adapted to be preset and to be indexed from station to station for selectively closing the other of each pair of said switches, whereby said motor is energized causing rotation of said cam means until it opens the switch corresponding to one closed by said presettable indexable means.

8. Apparatus comprising in combination, a member; a steplessly variable speed transmission connected to said member for moving said member in either direction along a path of travel at any one of a plurality of speeds; an integrator connected to means for adjusting said transmission; a reversible electric motor drivingly connected to said integrator to vary the speed of said transmission; a control circuit including a pair of switches connected in series for energizing said motor for each of a predetermined number of speeds of said transmission; separately adjustable cam means drivingly connected to said motor and normally maintaining one of each pair of switches closed; means mounted in cooperating position relative to the other of said pairs of switches, adapted to be preset and to be indexed from station to station for selectively closing the other of each pair of said switches, whereby said motor is energized causing rotation of said cam means until it opens the switch corresponding to one closed by said presettable indexable means; and means within said control circuit for causing said reversible electric motor to rotate in the same direction in rotating said cam means to open the switch corresponding to one closed by said presettable indexable means.

9. Apparatus comprising in combination, a member; a steplessly variable speed transmission connected to said member for moving said member in either direction along a path of travel at any one of a plurality of speeds; an integrator connected to means for adjusting said transmission; a reversible electric motor drivingly connected to said integrator to vary the speed of said transmission; a control circuit including a pair of switches connected in series for energizing said motor for each of a predetermined number of speeds of said transmission; separately adjustable cam means drivingly connected to said motor and normally maintaining one of each pair of switches closed; means mounted in cooperating position relative to the other of said pairs of switches, adapted to be preset and to be indexed from station to station for selectively closing the other of each pair of said switches; means within said control circuit for causing said reversible electric motor to rotate said cam means in a direction directly to the next selected speed; and means within said control circuit for causing said reversible electric motor to rotate in the same direction in rotating said cam means to open the switch corresponding to one closed by said presettable indexable means.

10. In a machine tool, a tool head adapted to be moved along intersecting paths; a rotatable work-supporting table mounted in cooperative position relative to said tool head; a variable speed feedworks transmission connected to said tool head for moving said tool head along a selected of said paths at a predetermined speed and in a selected direction; a variable speed headstock transmission connected to said work-supporting table for rotating said work-supporting table at any one of a plurality of speeds; a presettable function data storage drum connected to said feedworks and headstock adapted to be indexed from station to station; position data storage means cooperable with said function drum for determining the duration of a function set up on said function drum; rotatable cam means connected to said headstock transmission for varying the speed of said headstock transmission; a motor connected to said cam means; servomechanism connected to said motor for controlling the rotation of said cam means; and adjustable means adapted to be fixed at any station of said drum for controlling the operation of said servomechanism.

11. In a machine tool, a tool head adapted to be moved along intersecting paths; a rotatable work-supporting table mounted in cooperative position relative to said tool head; a variable speed feedworks transmission connected to said tool head for moving said tool head along a selected of said paths at a predetermined speed and in a selected direction; a variable speed headstock transmission connected to said work-supporting table for rotating said work-supporting table at any one of a plurality of speeds; a presettable function data storage drum connected to said feedworks and headstock adapted to be indexed from station to station; position data storage means cooperable with said function drum for determining the duration of a function set up on said function drum; rotatable cam means connected to said headstock transmission for varying the speed of said headstock transmission; a motor connected to said cam means for rotating said cam means; a control circuit for said motor including a presettable potentiometer; another potentiometer within said control circuit that is operated by the rotation of said cam means; and adjustable means adapted to be attached to said function data storage means at any of its index positions for operating said presettable potentiometer.

12. Apparatus comprising in combination, a member; a steplessly variable speed transmission connected to said member for moving said member in either direction along intersecting paths at any one of a plurality of speeds; an integrator connected to said transmission for adjusting said transmission; a motor connected to said integrator for operating said integrator to vary the speed of said transmisison; a control circuit for said motor including a pair of series connected switches for energizing said motor for each of a predetermined number of speeds of said transmission; separately adjustable cam means drivingly connected to said motor and normally maintaining one of each pair of switches closed; means mounted in cooperating position relative to the other of said pairs of switches, adapted to be preset and to be indexed from station to station for causing said member to move along a selected path and for closing the other of each pair of said switches, whereby said motor is energized causing rotation of said cam means until it opens the switch corresponding to one closed by said indexable means; distance data storage means connected to said member for each path of movement including a plurality of movement responsive switches and switch actuators adapted to be preset for determining the terminal position of said member and for indexing said indexable means; separate distributor stepping switches connected into the circuit for the movement responsive switches for each path of movement; and means connected to said indexable means and responsive to the rendering effective of one of said movement responsive switches due to the movement of said member along the corresponding path for indexing the corresponding distributor stepping switch and said indexable means.

References Cited by the Examiner

The following references, cited by the Examiner, are of record in the patented file of this patent or the orignal patent.

UNITED STATES PATENTS

| | | |
|---|---|---|
| 1,462,354 | 7/1923 | Pero. |
| 2,575,792 | 11/1951 | Bullard et al. |

DAVID J. WILLIAMOWSKY, *Primary Examiner.*

H. S. LAYTON, *Assistant Examiner.*